United States Patent Office 3,414,526
Patented Dec. 3, 1968

3,414,526
FLAME-RETARDANT, NONSHRINKING UREA-FORMALDEHYDE FOAMS
Paul J. Mason, Hopewell, Va., assignor to Allied Chemical Corporation, New York, N.Y., a corporation of New York
No Drawing. Filed Mar. 13, 1964, Ser. No. 351,864
9 Claims. (Cl. 260—2.5)

ABSTRACT OF THE DISCLOSURE

A nonshrinking, flame-retardant, solid urea-formaldehyde foam prepared from a mixture of (a) an aqueous solution of a urea-formaldehyde resin (b) a polyethylene glycol having a molecular weight between about 200 and 600 (c) furfuryl alcohol and (d) an aqueous solution of a foaming agent and an acid curing agent.

The present invention relates to flame-retardant urea-formaldehyde insulating foams and to a process for preparing such foams wherein excessive shrinkage of the foam during curing and drying is avoided.

Resinous foams prepared from aqueous urea-formaldehyde solutions, hardened and cured by an acidic hardening agent followed by curing and drying to eliminate residual water are known. Either the aqueous formaldehyde solution or the aqueous hardener solution (i.e. an aqueous solution of an acidic material) may be first converted into a foam by the incorporation of a foaming agent therein such as a surface active agent, followed by foam production, as by whipping up the solution in a beater or by atomizing air or other inert gas into the solution. The foam is then blended with the other resin component, whereupon the acid in the hardener component acts to cure and harden the resinous foam without collapse of the foam. Residual water may be eliminated by drying at room temperature or at slightly elevated temperatures.

Urea-formaldehyde foams are useful for insulating purposes and may be deposited immediately upon preparation of the foam into the structures to be insulated, for example into cavities in the walls and ceilings of homes and other structures. Such foams have the added advantage of being substantially flame-retardant usually to a sufficient extent as to be rated "self-extinguishing" as tested according to ASTM Test Method D-1692-59T, a standard flammability test.

In the curing and drying process, however, conventionally prepared urea-formaldehyde resin foams have the disadvantage of undergoing excessive shrinkage often suffering a linear shrinkage of up to 10% or higher. This shrinkage tendency limits the adaptability of such foams for insulating purposes and when used for home and other building insulation wherein wall and ceiling cavities are filled with freshly prepared foam, produces insulation which on curing and drying no longer completely fills the cavities but leaves non-insulating voids throughout the treated areas.

It has been found that the addition of a small proportion of a polyethylene glycol to the urea-formaldehyde resin solution prior to foaming reduces the lineal shrinkage of the resulting cured and dried resin foams significantly. For example, it has been found in copending application Ser. No. 317,078, filed Oct. 17, 1963, and assigned to this common assignee that addition to the resin solution of between about 10% and about 30% (based on the weight of the urea-formaldehyde resin solids) of polyethylene glycol having a molecular weight in the range between about 200 and about 600, reduced the lineal shrinkage of the resin to not more than about 3% of the length of the freshly prepared foam.

However, the presence of the polyethylene glycol in the foam so enhances the flammability of the resultant foam that the foam is no longer "self-extinguishing" but actually sustains combustion. I have now found that the addition of furfuryl alcohol to polyethylene glycol containing resin solution will permit production of a foam with reduced shrinkage, which when dried will be rated by the ASTM Test D-1692-59T as "self-extinguishing." I have also found that the shrinkage of such a foam will be at least as low as foams containing polyethylene glycol without furfuryl alcohol.

It will be seen that a primary object of the present invention is to provide a substantially nonshrinking urea-formaldehyde foam having flame-retardant properties.

Another object of the invention is to render self-extinguishing a polyethylene glycol-containing foam which normally will sustain combustion.

A still further object of the invention is to provide a process for preparing nonshrinking, flame-retardant urea-formaldehyde insulating foams.

In the manner according to my invention I provide a urea-formaldehyde resinous foam composition which is substantially nonshrinking and which is "self-extinguishing" as rated by the above-mentioned ASTM Test D-1692-59T. This is accomplished by adding to the polyethylene glycol-containing resin solution, a small amount, at least about 0.8%, preferably between about 0.8% and about 8.0% by weight (based on the weight of the urea-formaldehyde resin solids) of furfuryl alcohol and effecting the cure of the resin solution with an acidic hardener comprising a relatively strong acid such as hydrochloric acid, acetic acid, formic acid, sulfuric acid, or phosphoric acid. The effect of the addition of furfuryl alcohol is surprising because the alcohol itself is quite flammable. The amount of furfuryl alcohol should be at least about 0.8% by weight based on the urea-formaldehyde resin solids to afford a self-extinguishing foam. Greater quantities can be used and amounts up to 20% or higher have been used without damage to the foam, but amounts greater than about 8.0% appear to add no advantages to the fire-proofing properties of the foam, and hence use of such quantities are not preferred.

In carrying out the process according to my invention a urea-formaldehyde solution is prepared in a conventional manner having a solid content between about 50% and about 65% and a mol ratio of formaldehyde to urea between about 1.4 and about 2.2. To this solution are added between about 10% and about 30% of a polyethylene glycol having a molecular weight between about 200 and about 600 based on the weight of the urea-formaldehyde resin solids, calculated as all the urea and formaldehyde used in the resin and between about 0.8% and about 8.0% of furfuryl alcohol, based on the weight of urea-formaldehyde resin solids.

A hardener solution is separately prepared comprising an aqueous solution containing a small proportion, between about 2% and about 8% of an aqueous foaming agent such as an alkyl aryl sulfonic acid, alkyl aryl sulfate, or alkyl aryl sulfonate, and between about 0.5% and about 6.0% of a relatively strong acid such as hydrochloric acid, acetic acid, formic acid, sulfuric acid, or phosphoric acid.

In the above-mentioned copending application, a dialkyl alkanephosphonate is used as opposed to the furfuryl alcohol of the present invention, and the curing of the resin solution is effected with an acidic hardener containing phosphoric acid.

In contrast thereto by the process of my invention I achieve superior results on the basis of cost, better flame resistance, and by the use of diversified acid curing catalysts, not only phosphoric acid.

The hardener solution is converted to a foam, as by atomizing air or other inert gas into the solution. Then resin solution and foamed acid-containing hardener solution are mixed in proportions between about 0.5 and about 2.3 parts of hardener solution per part of resin solution. The mixing may be effected in a mixing tank or in a foam gun and the resulting foam may be delivered to a mold or to any cavity to which it is desired to supply insulating material and maintained in such cavity until the foam has hardened by the action of a curing catalyst and substantially all the water has evaporated.

In the preferred process, the resin solution used is prepared as follows: Formaldehyde and urea are reacted in a 2–2.1 to 1 mol ratio. The proper amounts of formaldehyde and urea are dissolved in water to give a 50% to 55% solution. A few percent of ethylene glycol, about 1–2% furfural and about 1–2% furfuryl alcohol are added and the pH of the solution is adjusted to 8 with 4 N NaOH. The resulting solution is heated to about 95° C. and held there for about 30 minutes. At this point, the pH of the solution is adjusted to 4.5 with 4 N formic acid and the solution is heated at about 100° C. for five to fifteen minutes. This "acid reaction" is carried out long enough so that the resin solution will give a turbid suspension when a drop of resin solution is added to 400 ml. of water at 0° C. The acid reaction is also carried out long enough to give a solution with a viscosity of 15 to 30 centipoises at 25° C.

When the acid reaction is complete as determined by the two criteria above, the pH of the solution is adjusted to 7.5 to 8.5 with 4 N NaOH and the solution is cooled to ambient temperature as rapidly as possible. When the solution is cool a few percent of ammonium carbonate or ammonium bicarbonate is added to decrease formaldehyde odor. After this addition is complete, polyethylene glycol having an average molecular weight of 200 to 600 is added to give 10% to 30% based on the weight of the urea-formaldehyde resin solids.

Resin prepared in this way can be stored for at least two months. For home insulation more urea is preferably dissolved in the resin to lower the mol ratio of formaldehyde to urea to between 1.4 and 1.7 to 1.

Foam is produced by frothing a hardener solution which is composed of 2% to 5% by weight of a surfactant such as Nacconol SZA (alkyl aryl sulfonic acids) and 0.5% to 6% by weight of acid, preferably sulfuric or phosphoric acid, and blending the resin described above into the hardener froth by a suitable machine. Self-extinguishing foam with densities from 0.2 to 0.8 pound per cubic foot are readily prepared by mixing the resin solution and the foamed hardener solution in weight ratio between 0.5 and 2.3 parts of hardener per part of resin solution and permitting the resultant mixture to harden and dry.

The resulting resinous foam after curing and drying will be composed of between about 10% and about 25% by weight of polyethylene glycol and between about 0.7% and about 7% by weight of furfural and between about 0.7% and about 7% by weight of furfuryl alcohol and between about 1% and about 15% by weight of phosphoric or sulfuric acid, the balance urea-formaldehyde resin solids.

The resulting foams after curing and drying are substantially flame-retardant to be rated "self-extinguishing" when tested according to ASTM TEST Method D–1692–59T, and have linear shrinkage values of not more than about 3% and usually less than about 1%. These foams are useful as insulating barriers in the ceilings and walls of homes and other structures, and in any applications wherein lightweight insulation is desired.

The ASTM D–1692–59T test is carried out by preparing a plastic foam specimen 2 inches by 6 inches by ½ inch, and marking each specimen across its width by two lines 1 and 5 inches, respectively from one end of the specimen. In making the test, specimens are supported on hardware cloth and placed horizontally with one end touching a bent up portion of the support. A Bunsen burner with wing top is placed under the bent up end of the specimen support with one edge of the flame in line with a vertical section of hardware cloth and the other edge of the flame extending to the front edge of the specimen, and the center of the width of the wing top directly under the center of the specimen. The burner is removed at the end of 1 minute or when the flame front reaches the first gage mark. If no evidence of ignition is seen after removal of the flame, the specimen is rated "nonburning by this test." If the specimen continues to burn after removal of the flame and burns past the second gauge mark, it is rated "burning by this test." If the specimen burns on exposure to the flame, but does not burn past the second gage mark on removal of the flame, it is rated "self-extinguishing by this test."

Lineal shrinkage of the foam is measured by feeding the thoroughly blended urea-formaldehyde-acidic hardener-containing foam to a mold cavity 8 feet long by 16 inches wide by 4 inches deep (the mold being placed horizontally to simulate the cavities between stringers in the ceiling of a dwelling). The cavity is completely filled, and then allowed to remain at ambient room temperatures (20–30° C.) for two weeks when the length of the foam bat in the panel is measured. A normal urea-formaldehyde foam of the character described herein, but containing no polyethylene glycol will shrink up to 10% or higher of its length leaving spaces of up to 5 inches at each end of the panel, i.e., as much as 10 inches or more of total unfilled space at the ends of the panel.

The invention will be described further in conjunction with the following specific examples but it is to be understood that these examples are merely illustrative and the invention is not intended to be limited thereto.

EXAMPLE I

A resin stock solution was prepared by mixing 25.38 parts urea, 71.24 parts of about 37% formalin (uninhibited) equivalent to 26 parts of formaldehyde, 1.69 parts of ethylene glycol, 0.76 part furfural, and 0.93 part furfuryl alcohol. The mixture was adjusted to pH 8 with 4 N sodium hydroxide, heated to about 95° C., and held at that temperature for 15 minutes. The pH gradually drifted to 6.4 during this period. The pH of the solution was then lowered to 4.5 with 4 N formic acid and heated at 97° C. to 102° C. for an additional nine minutes. A one drop test portion of the solution gave a turbid suspension when added to 400 ml. of water at 0° C. The pH was raised to about 8.6 with 4 N sodium hydroxide and the resin was cooled rapidly to room temperature (about 25° C.). Thereafter 0.85 part ammonium bicarbonate was added. The pH was again adjusted with 4 N sodium hydroxide to 7.3. Viscosity of the resulting clear resin was 18.5 centipoises at 25° C. as measured by a Brookfield Model LVF viscometer. Prior to use, 7.01 parts urea per 100 parts resin solution were added to adjust the formaldehyde to urea mol ratio from 2.05 to about 1.6 and 6.96 parts of polyethylene glycol, average molecular weight 300, were added for each 100 parts of resin solution.

A hardener stock solution was prepared by mixing 4 parts of Nacconol SZA, (an alkyl benzene sulfonic acid composition), 4 parts 85% phosphoric acid and 92 parts water.

Foam was prepared by atomizing air into 2 parts by volume of hardener solution and mixing 1 part of resin therewith in a mixing chamber and allowing the foam to flow into suitable molds where it hardened within a few minutes at room temperature. Foam density was about 0.3 pound per cubic foot after drying for one month at room temperature. Shrinkage was less than 1% on a linear basis. The dry foam was rated "self-extinguishing" with a burning extent of 2.3 inches in accordance with ASTM D–1692–59T.

EXAMPLE II

Example I was repeated except that furfural was omitted. Thereafter the dry foam obtained was rated "self-extinguishing" with a burning extent of 2.3 inches by the ASTM D-1692-59T test. However, it was found that this foam was less resilient than the foam containing furfural.

I claim:
1. A process for preparing a substantially nonshrinking, flame-retardant, solid urea-formaldehyde foam which comprises (1) preparing a dispersion of (a) an aqueous urea-formaldehyde resin solution having a formaldehyde-urea mol ratio between about 1.4 to about 2.2, and a urea-formaldehyde solids content between about 50% and about 65%, the balance water, (b) between about 10% and about 30% by weight based on the weight of the urea-formaldehyde resin solids of a polyethylene glycol having a molecular weight between about 200 and about 600 and (c) between about 0.8% and about 8.0% by weight, on the same basis, of furfuryl alcohol, (2) preparing a foamed hardener solution comprising an aqueous solution containing a small proportion of a foaming agent and between about 0.5% and about 6.0% of a strongly acid, curing agent, (3) mixing the resin solution and the foamed hardener solution in a weight ratio between about 0.5 part and about 2.3 parts foamed hardener solution per part of resin solution to form a substantially homogeneous foam, and curing the foam.

2. The process according to claim 1 wherein the formaldehyde-urea mol ratio is between about 1.4 and about 1.7.

3. A nonshrinking, flame-retardant, urea-formaldehyde foam composition comprising (a) an aqueous urea-formaldehyde resin solution having a formaldehyde-urea mol ratio between about 1.4 and about 2.2, and a urea-formaldehyde solids content between about 50% and about 65%, the balance water, (b) between about 10% and about 30% by weight based on the weight of the urea-formaldehyde resin solids of a polyethylene glycol having a molecular weight between about 200 and about 600 and (c) between about 0.8% and about 8.0% by weight, on the same basis, of furfuryl alcohol, (d) a foamed hardener solution comprising an aqueous solution containing between about 2% and about 5% of a foaming agent and between about 0.5% and about 6.0% of a strong acid, the resin-foamed hardener solution mixture being in a weight ratio between about 0.5 part and about 2.3 parts foamed hardener solution per part of resin solution.

4. A composition according to claim 3 wherein the formaldehyde-urea mol ratio is between about 1.4 and about 1.7.

5. The process according to claim 1 wherein the amount of furfuryl alcohol is about 2–4% based on the weight of the urea formaldehyde resin solids.

6. The composition of claim 3 wherein the amount of furfuryl alcohol is about 2–4% based on the weight of the urea formaldehyde resin solids.

7. Non-shrinking, flame-retardant solid urea formaldehyde foam produced by curing and drying the composition of claim 3.

8. Non-shrinking, flame-retardant solid urea formaldehyde foam produced by curing and drying the composition of claim 4.

9. Non-shrinking, flame-retardant solid urea formaldehyde foam produced by curing and drying the composition of claim 6.

References Cited

UNITED STATES PATENTS

| | | | |
|---|---|---|---|
| 2,807,595 | 9/1957 | Brown | 260—2.5 |
| 3,006,871 | 10/1961 | Sunderland | 260—2.5 |
| 3,150,108 | 9/1964 | Vieli | 260—2.5 |

MURRAY TILLMAN, *Primary Examiner.*

JOHN C. BLEUTGE, *Assistant Examiner.*